UNITED STATES PATENT OFFICE.

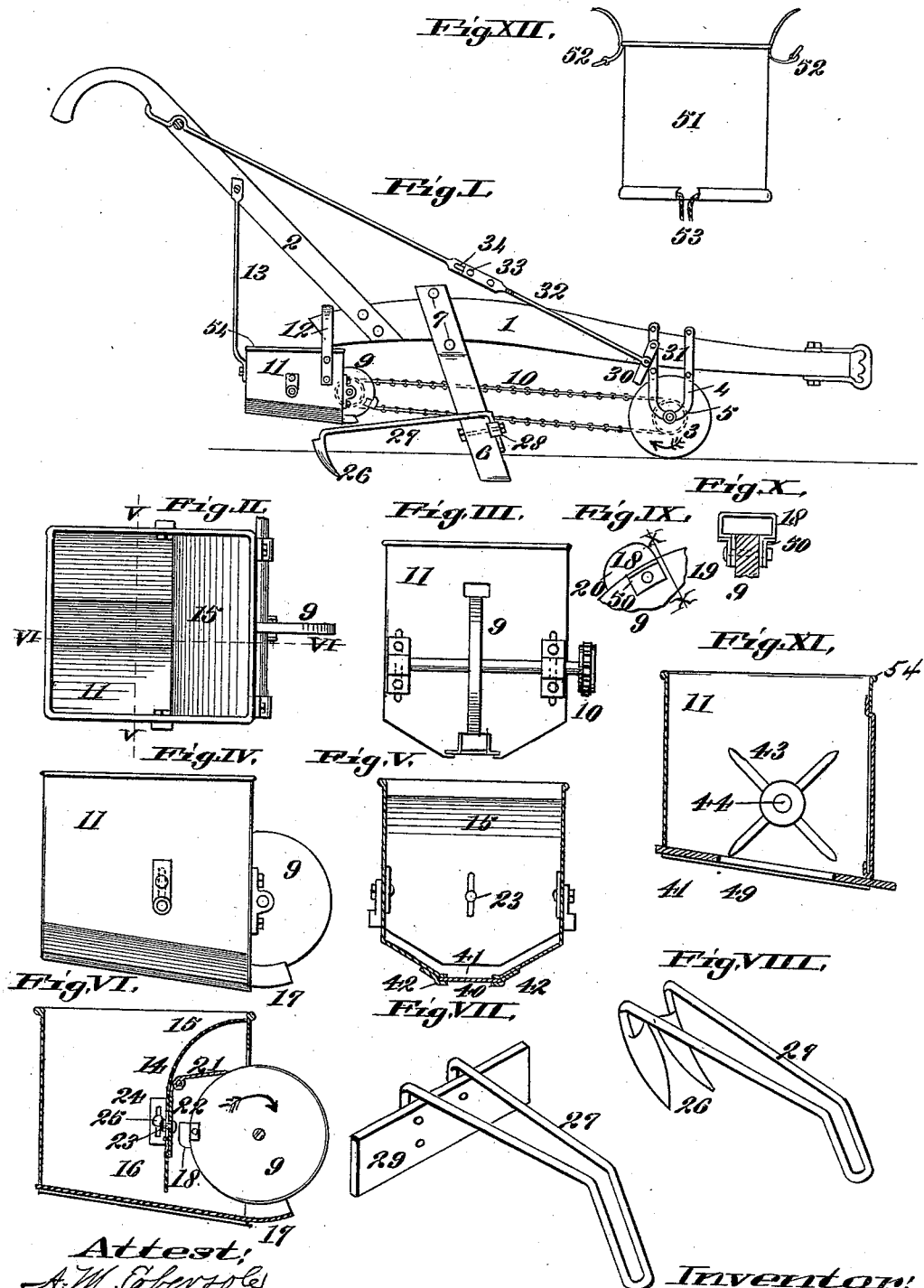

WILLIAM C. SANDERS, JR., OF LUVERNE, ALABAMA.

COMBINED CORN AND COTTON PLANTER.

SPECIFICATION forming part of Letters Patent No. 526,000, dated September 11, 1894.

Application filed May 16, 1894. Serial No. 511,444. (No model.)

*To all whom it may concern:*

Be it known that I, WILLIAM C. SANDERS, Jr., of Luverne, in the county of Crenshaw and State of Alabama, have invented a certain new and useful Improvement in a Combined Corn and Cotton Planter, of which the following is a full, clear, and exact description, reference being had to the accompanying drawings, forming part of this specification.

My invention relates to an improved machine, which may be used for planting either corn or cotton seeds, and which may be quickly changed from one kind of work to the other.

My invention consists in features of novelty hereinafter fully described and pointed out in the claims.

Figure I is a side elevation of my improved planter. Fig. II is an enlarged, top view of the hopper, for containing the seed, and showing also the distributing wheel for use in planting corn. Fig. III is a front elevation of the hopper and distributing wheel. Fig. IV is a side elevation of the hopper and distributing wheel. Fig. V is a vertical section, taken on line V—V, Fig. II. Fig. VI is a vertical section, taken on line VI—VI, Fig. II, and showing the hopper equipped for planting corn. Fig. VII is a perspective view of the scraper for covering the seeds. Fig. VIII is a perspective view of the plow for covering the seeds. Fig. IX is a detail view of the distributing wheel, showing one of the cups. Fig. X is a section taken on line X—X, Fig. IX. Fig. XI is a vertical section of the hopper equipped for planting cotton seed; and Fig. XII is an elevation of a sack or bag which may be used above the hopper to increase the capacity for holding grain.

Referring to the drawings, 1 represents the beam, and 2 the handles of the machine.

3 represents a ground or driving wheel secured to the beam 1, by means of a U-shaped frame 4, in which the wheel is journaled at 5.

6 represents a plow standard secured to the beam 1 at 7, and which forms a furrow into which the grain is dropped by the distributing wheel 9.

The shaft of the wheel 3 is connected by a belt 10 to the shaft of the distributing wheel 9, the belt passing around suitable pulleys or wheels on the two shafts, so that as the wheel 3 turns by contact with the ground, the wheel 9 is turned in the direction of the arrow, Figs. I and VI.

11 represents a box or hopper secured to the plow beam beneath the rear end of the latter by means of braces 12 and 13, and within which, when corn is to be planted, there is a guard 14, having a rounded top 15, and the lower end 16 of which does not quite extend to the bottom of the box or hopper as shown in Fig. VI.

The distributing wheel 9 is secured to the front of the box, and its periphery enters the box in front of the guard 14. The lower edge of the wheel 9 is a short distance above the bottom of the box, and the box is preferably provided with a curved lip 17, somewhat wider than the thickness of the wheel 9, so that the grain is not likely to waste through the opening in front of the box in which the wheel 9 fits.

The wheel 9 is provided with cups or buckets 18, of which there may be any desired number. I have only shown one, but in practice the wheel would be provided with several. These buckets are open at their forward or advance ends 19, and closed at their rear or follow ends 20, so that as the wheel revolves, the buckets take up a few grains of corn, and carrying them around the wheel, deposit them on the ground behind the plow 6. Any surplus corn which may be lodging on top of the buckets and against the periphery of the wheel 9, is rubbed off by a flap 21, hinged to a plate 22, that is secured to the guard 14 by means of a bolt 23, fitting in a slot in the guard, and in a perforation in the plate 22, so that the flap 21 may be raised or lowered at will. The guard 14 is connected to the sides of the box by means of brackets 24 secured thereto, and which are slotted to receive bolts 25 which pass through the sides of the box, as shown in Figs. V and VI. This permits the guard to be raised or lowered so as to increase or diminish the space between the lower edge of the guard and the bottom of the box, and thus regulate the flow of corn to the distributing wheel 9. The bottom of the box is made inclined, as shown in Fig. VI, so that the corn will feed toward the wheel 9. The upper edge of the guard 14 is curved forwardly, and joins the front of the box, so as to keep corn from falling onto the wheel 9, and compelling all of the corn that reaches the wheel to pass beneath the lower edge of the guard.

The corn or the seeds, as the case may be, are covered by means of plows 26, fastened to the shank of the plow standard 6, by means of an arm 27, and a clamp 28. As the machine is drawn forward, the plows 26 throw the earth into the furrow formed by the plow 6, and thus covers the grain which is dropped by the wheel 9 into the furrow between the two plows.

Instead of using the plows 26, a scraper 29 may be used, this scraper being attached to the shank of the plow standard 6 in the same manner that the plows 26 are attached.

30 represents a brake, which may be applied to the wheel 3 to stop the machine when it is desired to do so. This brake consists of a block, pivoted at 31, and to which is connected a rod 32 that extends back within reach of the operator, and which is preferably made in two parts connected by bolts 33 fitting in a slot 34, so that the length of the rod may be changed at will.

To adapt the machine to plant cotton seeds, and for dumping the surplus seed I form a slot 40 in the bottom of the box, which, when corn is being planted is closed by a slide 41, fitting in guides 42; and the curved extension 17 already referred to may be formed upon this slide.

When cotton seeds are to be planted, the slide 41 is provided with a slot 49, (see Fig. XI,) and the seeds are fed through the opening or slot 49, by means of prongs 43 on a shaft 44, which fits in the openings in the sides of the box, which openings were occupied by the bolts 25, when corn was being planted; the guard 14 being removed when cotton seed is being planted. The shaft 44 is turned by the chain 10, which is lengthened to connect with the shaft 44, the wheel 9 not being used at this time.

The buckets 18 are strengthened and supported by means of angle plates 50, through which pass the bolts that connect the buckets to the wheel 9. (See Figs. IX and X.)

For the purpose of increasing the capacity of the box 11, a sack or bag 51 may be used, the sack being provided with straps 52 by which it is attached to the handles of the machine, and having a cord 53 at its lower end, by which it is drawn tightly around the upper end of the box 11, beneath a bead 54 on the upper edge of the box.

I claim as my invention—

1. In a seeder, the combination of a box, a guard 14 within the box, a distributing wheel provided with buckets on its periphery, a hinged flap 21, secured to the guard, a driving wheel, a connection between the driving wheel and the distributing wheel, a plow for forming a furrow, and a covering device; substantially as and for the purpose set forth.

2. In a seeder, the combination of a box, an adjustable guard 14 within the box, a distributing wheel, provided with buckets on its periphery, an adjustable hinged flap 21 secured to the guard, a driving wheel, a connection between the driving wheel and the distributing wheel, a plow for forming a furrow, and a covering device; substantially as and for the purpose set forth.

3. In a seeder, the combination of a box, a guard 14 located within the box, and having a rounded, upper end, means for adjustably connecting the guard to the box, a hinged flap adjustably connected to the guard, a distributing wheel provided with buckets, a driving wheel, a belt connecting the driving wheel to the distributing wheel, a furrow plow, a covering device connected to the shank of the furrow plow, and a brake 30 having an adjustable rod 32; substantially as and for the purpose set forth.

WILLIAM C. SANDERS, JR.

In presence of—
JOHN W. BEALL,
J. H. COWART.